US008822821B2

(12) United States Patent
Kaiser (10) Patent No.: US 8,822,821 B2
(45) Date of Patent: Sep. 2, 2014

(54) PRE-INSTALLATION ASSEMBLY FOR A CONTACT ARRANGEMENT OF A SENSOR ASSEMBLY

(75) Inventor: Harry Kaiser, Markgroeningen (DE)

(73) Assignee: Robert Bosch GmbH, Stuttgart (DE)

( * ) Notice: Subject to any disclaimer, the term of this patent is extended or adjusted under 35 U.S.C. 154(b) by 523 days.

(21) Appl. No.: 13/002,608

(22) PCT Filed: Jul. 2, 2009

(86) PCT No.: PCT/EP2009/058349
§ 371 (c)(1),
(2), (4) Date: Jan. 4, 2011

(87) PCT Pub. No.: WO2010/000814
PCT Pub. Date: Jan. 7, 2010

(65) Prior Publication Data
US 2011/0108322 A1 May 12, 2011

(30) Foreign Application Priority Data

Jul. 4, 2008 (DE) .......................... 10 2008 040 180

(51) Int. Cl.
*H02G 15/02* (2006.01)
*H01R 13/24* (2006.01)
*B60T 8/36* (2006.01)
*G01L 19/00* (2006.01)
*G01L 19/14* (2006.01)
(52) U.S. Cl.
CPC .......... *B60T 8/3675* (2013.01); *H01R 13/2421* (2013.01); *G01L 19/0069* (2013.01); *G01L 19/143* (2013.01)
USPC .......................................... 174/75 F; 72/756

(58) Field of Classification Search
USPC ............................................. 174/75 F; 73/756
See application file for complete search history.

(56) References Cited

U.S. PATENT DOCUMENTS

| 4,029,375 A | 6/1977 | Gabrielian |
| 4,522,096 A | 6/1985 | Niven, Jr. |

(Continued)

FOREIGN PATENT DOCUMENTS

| DE | 10244760 | 10/2003 |
| DE | 10244760 A1 * | 10/2003 |

(Continued)

*Primary Examiner* — William H Mayo, III
*Assistant Examiner* — Hiram E Gonzalez
(74) *Attorney, Agent, or Firm* — Michael Best & Friedrich LLP (57) ABSTRACT

The invention relates to a pre-installation assembly for a contact arrangement of a sensor assembly, having a support component, a clamping component, and at least one spring contact pin. The conductive end areas of the at least one spring contact pin are connected with one another and are designed to be axially incompressible and held under an axial spring load between support surfaces that are at a distance from one another. According to the invention, the support component and the clamping component are connected with one another by way of a connection in which the at least one spring contact pin is positioned and held by way of aligned guides in the support component and in the clamping component, with the spring contact pin passing through the guides. In first end section of the at least one spring contact pin is axially supported in the associated guide of the support component, and a second end section of the at least one spring contact pin is axially supported in the associated guide of the clamping component.

20 Claims, 4 Drawing Sheets

(56) References Cited

U.S. PATENT DOCUMENTS

| | | |
|---|---|---|
| 4,536,820 A | 8/1985 | Binder et al. |
| 6,783,379 B2 * | 8/2004 | Kerscher et al. ............... 439/191 |
| 6,789,415 B1 * | 9/2004 | Kaiser et al. .................... 73/121 |
| 6,799,812 B2 | 10/2004 | Risch et al. |
| 2004/0147140 A1 * | 7/2004 | Fan et al. ........................ 439/66 |

FOREIGN PATENT DOCUMENTS

| | | |
|---|---|---|
| DE | 102007038534 A1 | 2/2009 |
| EP | 1113275 | 7/2001 |
| EP | 1431733 A1 | 6/2004 |
| JP | 7161416 | 6/1995 |

\* cited by examiner

PRE-INSTALLATION ASSEMBLY FOR A CONTACT ARRANGEMENT OF A SENSOR ASSEMBLY

CROSS-REFERENCE TO RELATED APPLICATION

This application is a 35 USC 371 application of PCT/EP 2009/058349 filed on Jul. 2, 2009.

BACKGROUND OF THE INVENTION

1. Field of the Invention

The invention relates to a pre-installation assembly for a contact arrangement of a sensor assembly.

2. Description of the Prior Art

In German Published Patent Disclosure DE 19917941 A1, a braking device for a vehicle brake system with a contact arrangement for a sensor assembly is disclosed. In the braking device described, the control electronics, to simplify installation, are accommodated in a housing inverted over at least one pressure sensor, and the electrical connection between the pressure sensor and the control electronics is made automatically upon installation via four spring contact pins. In the process, the housing is secured to a hydraulic block of the braking device, into which block at least one pressure sensor is inserted, so that the spring contact pins are braced on their ends with a defined contact pressure between the facing contact faces of the pressure sensor and of the control electronics. The spring contact pins are inserted into guides which are located in an insulation piece, and the spring contact pins each have a contact sleeve with a contact spring located in it and at least one contact tappet axially displaceable in the contact sleeve, which tappet is acted upon by the contact spring, embodied as a compression spring, in the expulsion direction out of the guide sleeve. Between the contact sleeve and the contact tappet, an axial brace is provided, by which the contact tappet is kept in its contact sleeve. This brace comprises a crimped-over peripheral zone on the end of the contact sleeve that a pistonlike thickened portion of the graduatedly offset contact tappet runs up against. In some embodiments of the known spring contact pins, both end regions are formed by a contact tappet, and from opposite directions the contact tappets engage their contact sleeve that forms the middle region of the spring contact pin. Between the thickened ends of the two contact tappets, the helical compression spring guided in the contact sleeve is braced and, when the spring contact pin has not yet been built in, presses the contact tappet into its terminal position in which it is maximally expelled from the contact sleeve. Thus even in the not yet built-in state, the spring contact pin comprising the contact sleeve, contact tappets and contact spring, forms a stably preassembled and thus easily manipulated assembly. The components of the spring contact pin, however, must be manufactured with extreme dimensional stability, to enable ensuring durable, problem-free contact-making. This is especially true when the assembly overall is designed in filigree fashion. As a result, producing the pre-installation assembly comprising the contact sleeve, contact spring and contact tappets is technically complicated as a whole, and even the individual spring contact pin comprising precision components is relatively expensive.

From German Patent Disclosure DE 10244760 A1, a contact arrangement in a pressure sensor assembly is also known, for monitoring pressure in a vehicle brake system. In this arrangement, spring contacts are provided, which comprise solely the spring winding of a wound helical compression spring and are therefore distinguished by a technically simple design. These helical compression springs used as spring contact pins each have two winding sections with different diameters, and the longer winding section, which penetrates guides in support components, has a markedly smaller winding diameter than a winding section that protrudes from the guides. To improve the guidance properties, the spring winding in the longer winding section is wound as a block; as a result, the axial spring load must be exerted solely by the winding section that protrudes from the guide, which to that end must be correspondingly compressed. The assembly process thus requires that outside the guide, there is enough space for supplying the component that is provided with the second contact face, so that the winding section protruding from the guide can be compressed to a suitable extent, thus providing the contact-making. The space required for compressing the winding section is not structurally available in all contact arrangements for sensor assemblies. Also, the contact face for the winding end of the shoulder winding section must be relatively large, which is again not wanted for every application, because it can have an adverse effect on the available space.

ADVANTAGES AND SUMMARY OF THE INVENTION

The pre-installation assembly according to the invention for a contact arrangement of a sensor assembly has the advantage over the prior art that a support component and a clamping component can be connected to one another in a simple way, via a connection, so that at least one spring contact pin is positioned and held in a simple way, via aligned guides, penetrated by the pin, in the support component and the clamping component. For forming the pre-installation assembly of the invention, the at least one spring contact pin is held in the guide of the support component, and a first end section of the at least one spring contact pin is axially braced in the associated guide of the support component. A second end section of the at least one spring contact pin is axially braced in the associated guide of the clamping component, and in the aligned position of the corresponding guides, the clamping component and the support component are connected to one another via the connection. After the clamping component has been connected to the support component, the at least one spring contact pin is automatically compressed to the desired length and is kept in this position, captive, in the aligned guides of the clamping component and of the support component. As a result, advantageously, an easily manipulated pre-installation assembly for a contact arrangement of a sensor assembly is created.

It is especially advantageous that the aligned guides of the support component and of the clamping component, in order to be connected to one another, can easily be put into their construction position via positioning mechanism of the corresponding support component and clamping component. As the connection and/or positioning mechanism between the clamping component and the support component, at least one press-fit peg, for instance, can be provided, which in the installed state is press-fitted into an associated press-fit bore. The press-fit peg and the associated press-fit bore can be structurally adapted to one another, for instance by a suitable predetermined shape, in such a way that in the installed state, a positionally correct connection between the clamping component and the support component is attainable. Alternatively, as the connection and/or positioning mechanism between the clamping component and the support component, a plurality of press-fit pegs and/or positioning pegs can be provided, which in the installed state are press-fitted into associated press-fit bores which are arranged in a suitable pattern. To facilitate the press-fitting operation in view of the relatively small dimensions of the individual components, a central press-fit peg can advantageously be provided as the connection between the clamping component and support component; in the installed state, this peg is press-fitted into an associated press-fit bore, and as a the positioning mechanism, a plurality of positioning pegs can be provided, which during the press-fitting operation are introduced into associated positioning bores which are arranged in a suitable pattern. The positioning pegs, which are smaller than the press-fit pegs, therefore serve the purpose of location positioning and therefore also serve as a protection against relative rotation.

To attain favorable installation conditions for a plurality of spring contact pins, these pins can be disposed at approximately equal spacing from one another along a circular path. The clamping component receiving the spring contact pins can be embodied, requiring little material or space, as a hood-like body with a central cup-shaped press-fit peg and a formed-on radially projecting annular collar; the guides for the associated end region of the spring contact pin are integrated as funnel-like sleeve bodies with the annular collar and protrude from a first face end, and in the installed state, the clamping component embodied as a hoodlike body, is connected to the corresponding support component via the central press-fit peg and a plurality of positioning pegs protruding from a second face end of the annular collar. The central press-fit peg and the at least one positioning peg extend in the same direction.

In a feature of the pre-installation assembly of the invention, the spring contact pin is embodied as a helical compression spring and at least predominantly comprises a spring winding, extending over the entire structural length of the helical compression spring, the winding sections of which spring winding, located in the end regions, are stiffened by inhibition of the axial mobility of their spring windings. As a result, advantageously, when the spring contact pin is embodied at least predominantly as a winding package, no sliding guide or the like, which requires the dimensionally stable cooperation of a plurality of contact elements, is necessary. Instead, the middle winding section serves as a compressible helical compression spring, while the winding sections in the pressure-reinforced end regions, although they do include spring windings, are however incompressible because of the component that inhibits the axial inward resilience, and thus are made pressure resistant. Such an axially inhibiting component can for instance be sleevelike plastic spray-coatings, with which the spring windings in the end regions are each sheathed or joined together up to near their end cooperating with the contact face. As a result of the structural simplification, even the individual spring contact pin can already be made quite economically.

Especially advantageously, the spring winding of the spring contact pin can be tapered in both winding sections forming the end regions. The correspondingly tapered ends of the spring contact pin can cooperate with correspondingly smaller counterpart contact faces. Moreover, the wire end of the tapered spring winding can itself form a kind of central contact tip, which can rest on the counterpart contact face with a correspondingly higher pressure per unit of surface area. A further factor is that the reaction forces of the contact tip that act on the spring winding are introduced virtually centrally, since they are located near the central longitudinal axis. As a result, the middle winding section used as a helical compression spring is stressed to a lesser extent for flexion and therefore need not necessarily have radial bracing or guidance in this middle region when the winding sections forming the end regions of the spring winding in turn engage fitting guides.

To bring about simple axial bracing and simultaneously simple centering of the winding sections, forming the end regions, in the guide penetrated by them, the transition region of the spring contact pin can be wound conically, from its middle winding section to the winding section on the end regions that forms the tapered end region, with adaptation to a conical seat in the associated guide of the support component and clamping component, respectively. By means of a mirror-symmetrical design of the spring contact pin with respect to its central transverse axis, it can then be ensured that the spring contact pin can cooperate in both end regions with a conical seat, and as a result, the installation of the spring contact pin can be done more simply and in a way that is more secure against mistakes.

An especially simple design of the spring contact pin can be attained if the spring windings in the end regions of the spring contact pin of the invention are wound as a block for axial stiffening of these end regions. As a result, the spring contact pin can be a winding package wound in one piece of spring wire and can thus be produced economically as a mass-produced part in an optionally automated work cycle. Moreover, the radial bracing of the conical transition regions in the conical guide can be improved by providing that the spring windings in the conical transition regions of the spring contact pin are at least predominantly, or entirely, also wound as a block. In contact-making for a sensor assembly or the like, the cost advantage is especially advantageous if the sensor assembly has a plurality of spring contact pins that are all designed structurally identically.

An advantageous embodiment of the invention is described in further detail below in conjunction with drawings. In the drawings, identical reference numerals identify associated components and elements that perform the same or analogous functions.

DESCRIPTION OF THE PREFERRED EMBODIMENT

Figure 1:
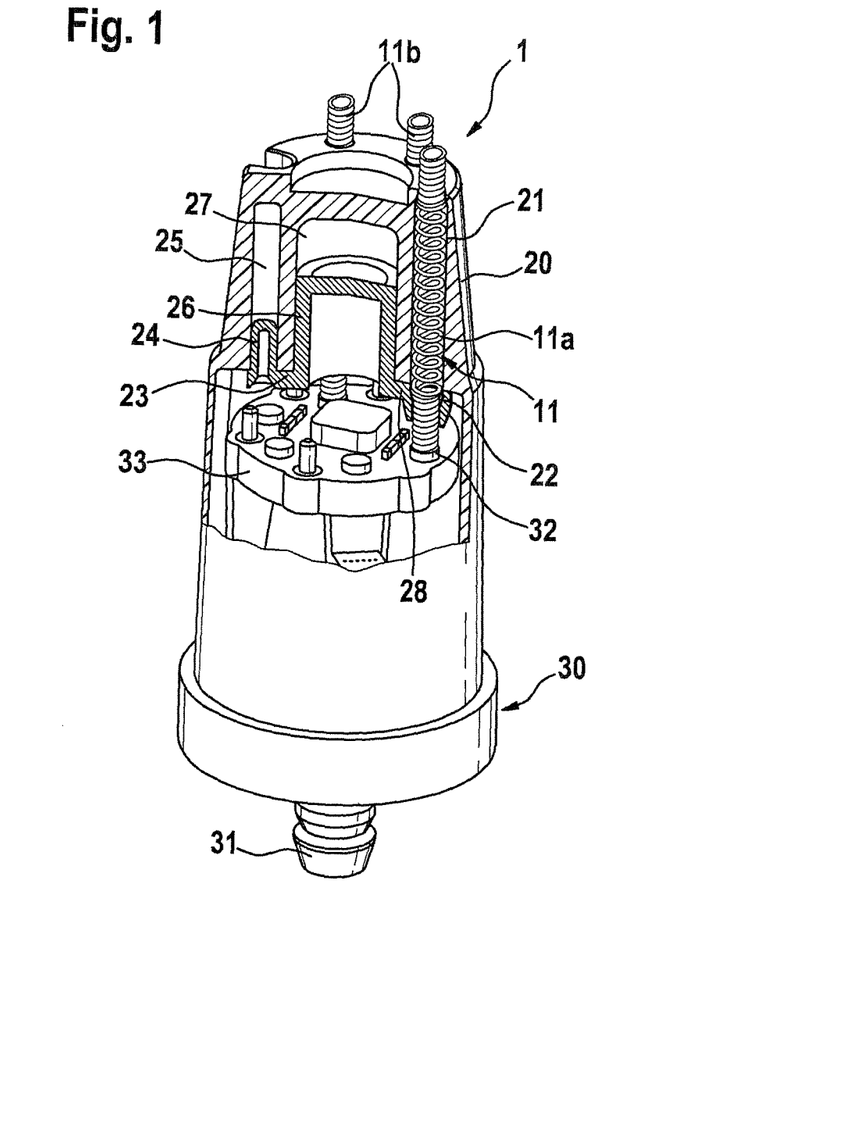
FIG. 1 shows a contact arrangement of a cut-open assembly of a pressure sensor for a fluid block in a perspective oblique view.

A contact arrangement 1 visible in FIG. 1 includes a total of four spring contact pins 11, which are disposed in a frustoconical housing capsule 20 of insulating plastic and serve the purpose of providing electrical contact for an attached control unit, not shown, for a braking device of a vehicle brake system with a pressure sensor of a sensor unit 30 for brake pressure measurement. Since the housing capsule 20 and the sensor unit 30 are shown broken open on a peripheral side, it is possible in FIG. 1 to see only three of the total of four spring contact pins 11. A tubular stub 31 protrudes from the underside of the sensor unit 30 and in the installed state engages an associated bore of a hydraulic block, not shown, thus providing sealing, and as a result, a fluidic communication of the pressure sensor with the hydraulic system of the associated brake system is established. In the assembled braking device, the contact arrangement 1 is thus located in such a way between the sensor unit 30 and a control housing, which is inverted in cuplike fashion over it, that the spring contact pins 11, under axial spring loading, rest by their lower end on the associated contact face of the pressure sensor and by their upper end on the associated contact face on the underside of the control housing and can ensure reliable signal transmission under all operating conditions, since the spring contact pins 11 are braced on the ends with a defined contact pressure between the contact faces, facing one another, of the sensor unit 30 on the one hand and the control electronics on the other. This contact-making is equivalent to the design of the contact arrangement 1 shown described in DE 19917941 A1, so that at this point further explanation of the overall arrangement will be dispensed with.

The individual spring contact pins 11 are each bent in one piece as a winding spring from spring wire that is a good conductor; the spring wire has a constant round cross section over the entire length of the spring winding. The spring winding of each of the structurally identical spring contact pins 11 is furthermore designed in principle as a helical compression spring and is made up of three longitudinal portions; only a middle winding section 11a is embodied as an axially compressible helical compression spring, because the windings in that longitudinal portion are wound extending toward one another at a suitable spacing. This middle winding section also has the greatest winding diameter, and this winding diameter is also constant. Adjoining the middle winding section 11a, the spring winding is wound as a block, and as a result there is no longer any axial spacing between the individual spring windings. Moreover, the spring winding tapers from the middle winding section 11a, with the interposition of a conical transition region, toward winding sections 11b forming the end regions of the spring contact pin 11. The winding sections 11b forming end regions each comprise a cylindrical winding package, which because of its windings resting on one another is embodied as axially pressure resistant and thus non-resilient.

Because of this non-resilient design of the winding sections 11b and because of the conical transition regions wound as a block, the spring contact pins 11 can be axially compressed only in the winding section 11a that forms the middle region.

In the pre-installation state with a correspondingly shortened spring winding, each of the spring contact pins 11 is braced axially between a conical annular end face of the guide 21 that predominantly receives it and an associated contact 32, which is located on the top side of a contact plate 33 forming the upper termination of the sensor unit 30. This guide 21, recessed out of the circumferential wall of the housing capsule 20, has an inside diameter in a lower longitudinal portion that is slightly greater than the winding diameter of the winding section 11a, and in the upper longitudinal portion, it changes over, forming the conical annular end face, into a through bore of lesser diameter; the bore diameter is slightly greater than the diameter of the winding section 11b. The through bore ends at the top side of the housing capsule 20, and the winding section 11b protrudes with part of its length out of the top side of the housing capsule 20. Between the contact plate 33 and the guide 21, the winding section 11b of each of the spring contact pins 11 penetrates a respective associated guide 22, which is recessed out of an annular collar 28 of a clamping component 23 embodied as a hoodlike body. This clamping component 23, likewise made from insulating plastic, is joined to the housing capsule 20 via a central cup-shaped press-fit peg 26 and a plurality of positioning pegs 24 of cylindrical basic shape that protrude from an upper face end of the annular collar 28. Preferably, the press-fit pegs 26 and the positioning pegs 24 are integrally injected onto the annular collar 28 and are thus embodied in one piece with it.

Figure 2:
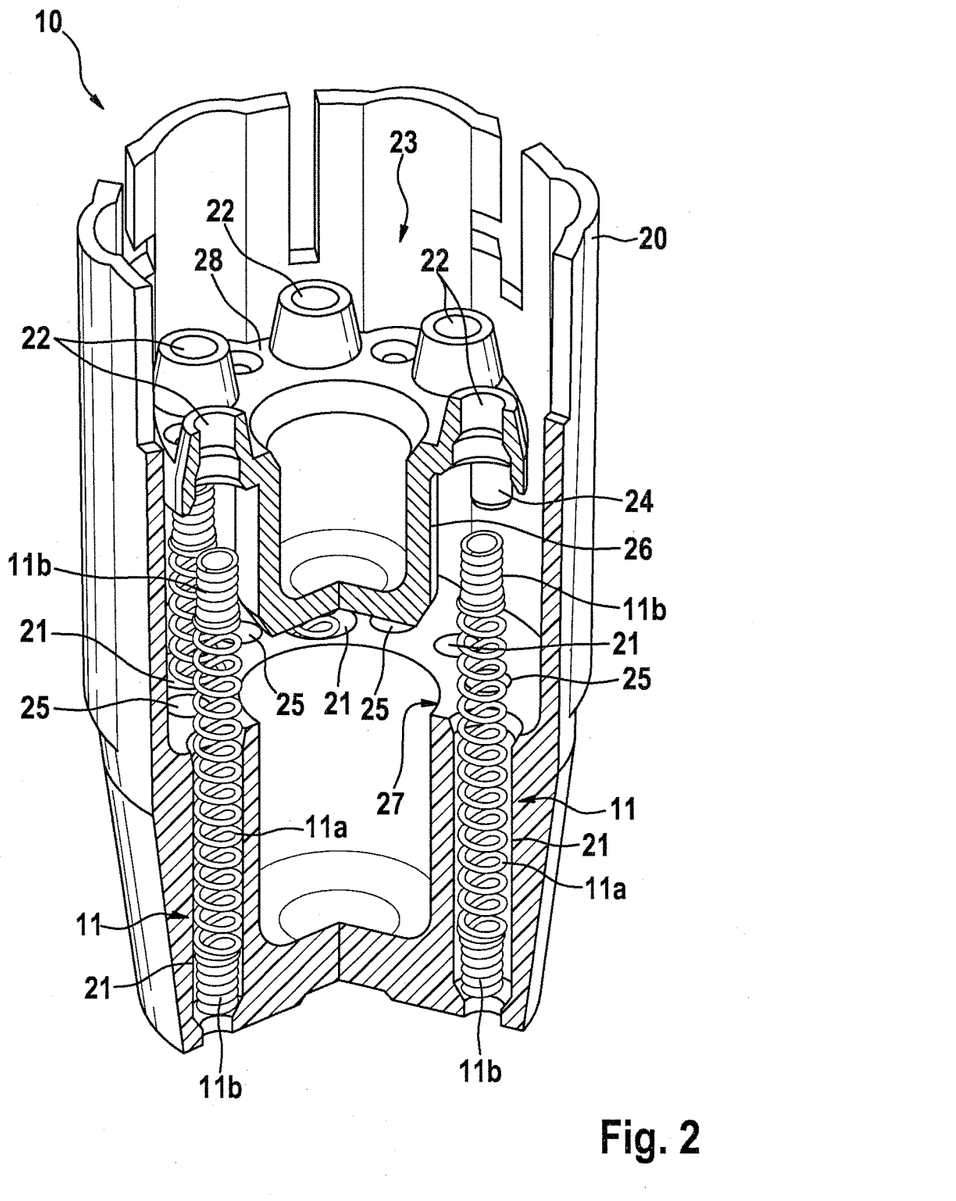
FIG. 2 is a perspective oblique view of a housing capsule of the assembly upon pre-installation of the spring contact pins, using a clamping component.
Figure 3:
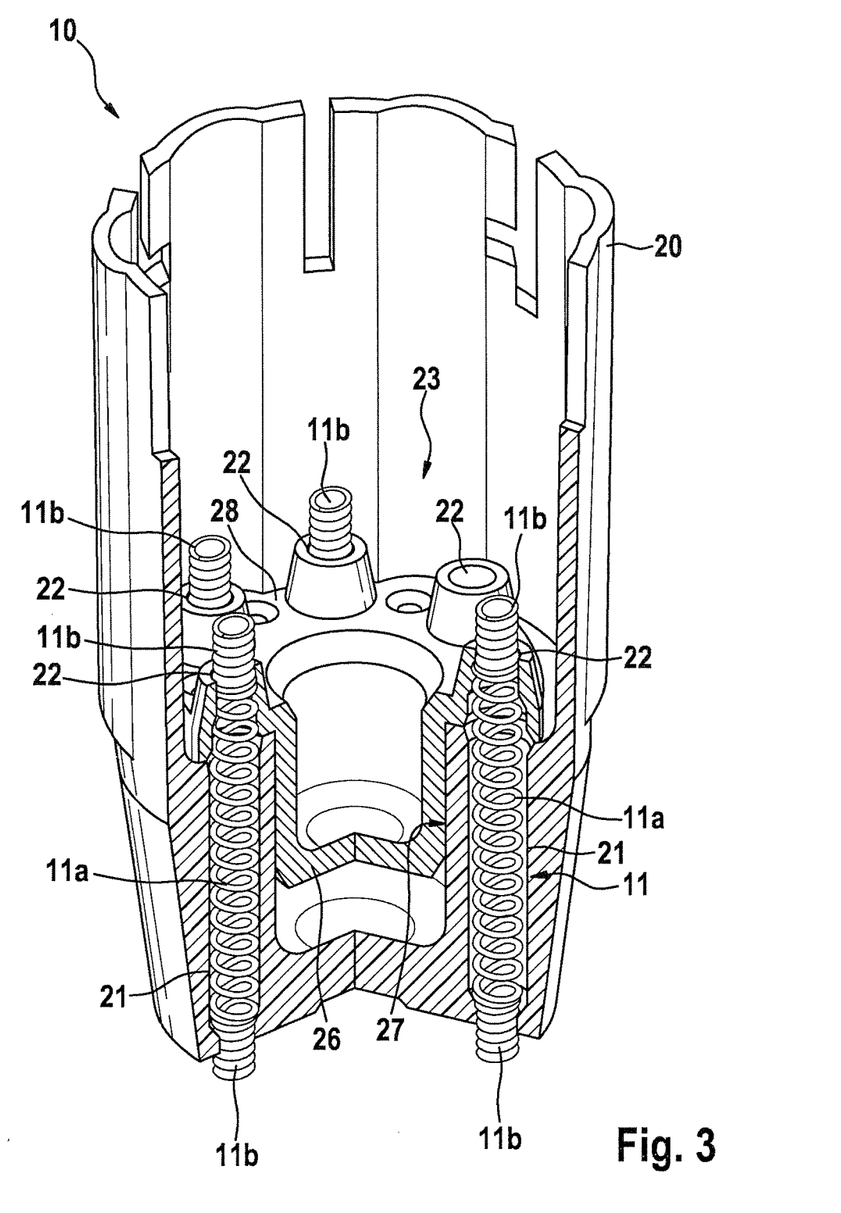
FIG. 3 shows the oblique view of FIG. 2 after the conclusion of the pre-installation of the spring contact pins.

As can be seen clearly in conjunction with FIGS. 2 and 3, the spring contact pins 11 can easily be joined to the housing capsule 20 and to the clamping component 23 embodied as a hoodlike body, to make a pre-installation assembly 10. The broken-up housing capsule 20 is shown rotated by 180° compared to FIG. 1 for the sake of better clarity, in a pre-installation position. In this rotated position, the end of the guides 21 having the large diameter is located at the top. Thus the spring contact pins 11 can also be thrust from above into the associated guides 21, after which their winding section 11b protrudes with part of its length out of the top side, now located at the bottom, of the housing capsule 20. The conical transition region wound as a block of the spring contact pins 11 rests on the conical annular end face of the guide 21 and is thus reliably braced axially from below. The spring winding of FIG. 2 initially still has its expanded original length, and as a result the spring contact pin 11 protrudes out of the associated guide 21 with approximately one-third of the length of the winding section 11a and with the adjoining winding section 11b. Given a suitably aligned association of its guides 22 with the spring contact pins 11, the clamping component 23 embodied as a hoodlike body is now placed on the upper winding section 11b thereof. Since the guides 22 taper upward in funnel-like fashion to a bore diameter that is slightly greater than the diameter of the winding section 11b, the winding sections 11b penetrate their guide 22 as far as their conically wound transition region, with axial bracing on the centering cone of the guide 22. By subsequent pressing down of the clamping component 23 in the sense of a parallel displacement downward, the spring contact pins 11 are jointly compressed to an increasing extent. The compression takes place solely in the winding section 11a, since the winding sections 11b have a rigid behavior and consequently cannot be compressed. After a suitable shifting distance, the end of the central press-fit peg 26 dips into the associated press-fit bore 27, recessed out of the housing capsule 20, and the ends of the positioning pegs 24, protruding downward from the lower face end of the annular collar 28, dip into their associated positioning bores 25 recessed out of the housing capsule 20. The introduction of the press-fit peg 26 into its press-fit bore 27 and the introduction of the positioning pegs 24 into the positioning bores 25 is made easier, since the free ends of their cylindrical base bodies are conically tapered, on the order of an encompassing chamfer.

Once the clamping component 23, embodied as a hoodlike body, has reached its terminal position shown in FIG. 3 by running up on the face end of the housing capsule 20, the spring contact pins 11 are automatically compressed to the desired length and kept in that position, since the clamping component 23 is reliably anchored on the housing capsule 20 via the press-fit peg 26 press-fitted into its press-fit bore 27. Thus an easily manipulated pre-installation assembly 10 according to the invention has been created from the housing capsule 20, spring contact pins 11, and clamping component 23. The pre-installation assembly 10 in the housing capsule can be placed in hoodlike fashion onto the sensor unit 30, and its positioning takes place in the exact rotary position via the circumferential contour of the sensor unit 30 and the housing capsule 20. Thus the ends of the winding sections 11b meet exactly at the associated contact 32 and, in the last phase of the insertion motion of the housing capsule 20, with slightly more lengthwise compression of the spring contact pins 11, these ends automatically bring about the electrical connection with the sensor unit 30, after which the contact arrangement 1 shown in FIG. 1 is present.

Figures 4, 5, 6:
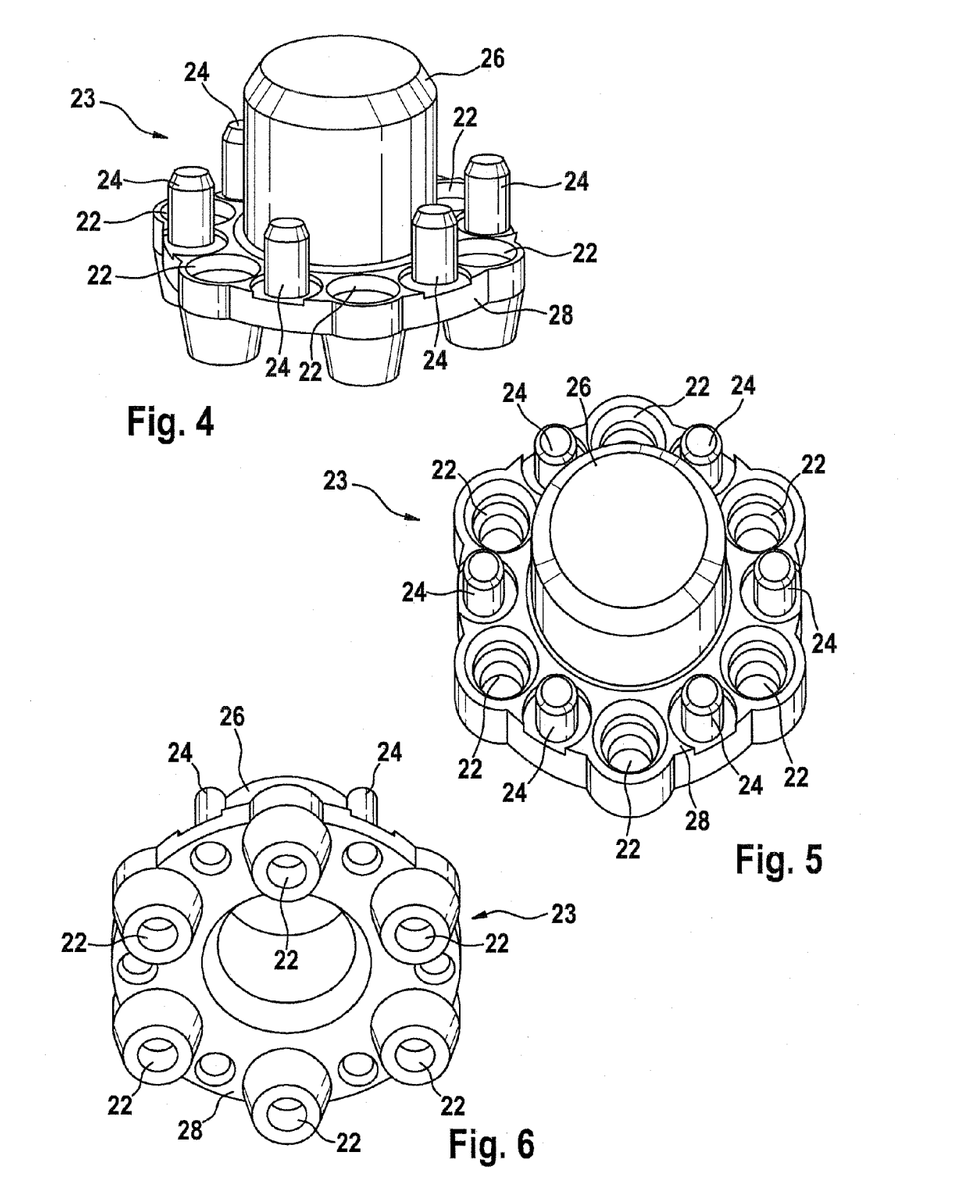
FIG. 4 shows the separate clamping component from its underside in a perspective oblique view.
FIG. 5 shows the clamping component of FIG. 4 in a perspective top view.
FIG. 6 shows the separate clamping component from its top side in a perspective oblique view.

In FIGS. 4, 5 and 6, the clamping component 23 embodied as a hoodlike body can be seen in a separate view with its details. The basic body of the clamping component 23 is a parallel, shallow, nearly circular annular collar 28, onto which a press-fit peg 26 is integrally formed centrally. From a face end of the annular collar 28, the positioning pegs 24 protrude perpendicular to the plane of the annular collar, while funnel-like sleeve bodies, which jointly with an associated bore in the annular collar define the guide 22, protrude from the opposite face end. The positioning pegs 24 and the central cup-shaped press-fit peg 26 extend in the same direction. The positioning pegs 24 and guides 22 are distributed uniformly over the face end of the annular collar 28 of the clamping component 23, and one positioning peg 24 is disposed between each two adjacent guides 22. As a result, especially favorable dimensioning of the clamping component 23 can be attained. Overall, the clamping component 23 has six guides 22 and six positioning pegs 24, although in the present application only four spring contact pins 11 are provided. This makes it possible for the housing capsule 20 to be used, even without structural changes, for other contact arrangements having up to six spring contact pins 11.

The foregoing relates to the preferred exemplary embodiment of the invention, it being understood that other variants and embodiments thereof are possible within the spirit and scope of the invention, the latter being defined by the appended claims.

What is claimed is:

1. A pre-installation assembly for a contact arrangement of a sensor assembly, the assembly comprising a support component, a clamping component, and at least one spring contact pin having end regions of the at least one spring contact pin conductively connected to one another which are embodied as axially pressure resistant and are kept with axial spring loading between spaced-apart support surfaces,
   the support component and the clamping component being connected to one another via a connection in which the at least one spring contact pin is positioned and held in the support component and in the clamping component via aligned guides in which the at least one spring contact pin is inserted, wherein
   a first end section of the at least one spring contact pin is axially braced in an associated guide of the support component, and a second end section of the at least one spring contact pin is axially braced in an associated guide of the clamping component, and wherein
   the spring contact pin is a helical compression spring embodied as a spring winding, which extends over an entire structural length of the pin and whose winding sections, located in the end regions of the spring contact pin, are stiffened by inhibition of axial mobility of their spring windings.

2. The pre-installation assembly as defined by claim 1, wherein the support component and the clamping component are connected to one another via a positioning element in an aligned position of the guides of the support component relative to the guides in the clamping component.

3. The pre-installation assembly as defined by claim 1, wherein as the connection between the clamping component and the support component, at least one press-fit peg is provided, which in an installed state is press-fitted into an associated press-fit bore.

4. The pre-installation assembly as defined by claim 2, wherein as the positioning element between the clamping component and the support component, at least one press-fit peg is provided, which in an installed state is press-fitted into an associated press-fit bore.

5. The pre-installation assembly as defined by claim 2, wherein as at least one of the connection element and the positioning element between the clamping component and the support component, at least one press-fit peg is provided, which in an installed state is press-fitted into an associated press-fit bore.

6. The pre-installation assembly as defined by claim 3, wherein the at least one press-fit peg of the associated press-fit bore are adapted structurally to one another such that in the installed state, a positionally correct connection between the clamping component and the support component is attainable.

7. The pre-installation assembly as defined by claim 4, wherein the at least one press-fit peg of the associated press-fit bore are adapted structurally to one another such that in the installed state, a positionally correct connection between the clamping component and the support component is attainable.

8. The pre-installation assembly as defined by claim 5, wherein the at least one press-fit peg of the associated press-fit bore are adapted structurally to one another such that in the installed state, a positionally correct connection between the clamping component and the support component is attainable.

9. The pre-installation assembly as defined by claim 1, wherein as the connection between the clamping component and the support component, a plurality of pegs are provided, which in an installed state are press-fitted into associated bores arranged in a suitable pattern.

10. The pre-installation assembly as defined by claim 2, wherein as the positioning element between the clamping component and the support component, a plurality of pegs are provided, which in an installed state are press-fitted into associated bores arranged in a suitable pattern.

11. The pre-installation assembly as defined by claim 2, wherein as at least one of the connection element and the positioning element between the clamping component and the support component, a plurality of pegs are provided, which in an installed state are press-fitted into associated bores arranged in a suitable pattern.

12. The pre-installation assembly as defined by claim 2, wherein as the connection between the clamping component and the support component, a central press-fit peg is provided; and that as the positioning element, a plurality of positioning pegs are provided, and in an installed state the central press-fit peg is press-fitted into an associated press-fit bore, and the positioning pegs are introduced into associated positioning bores arranged in a suitable pattern of holes.

13. The pre-installation assembly as defined by claim 3, wherein as the connection between the clamping component and the support component, a central press-fit peg is provided; and that as the positioning element, a plurality of positioning pegs are provided, and in an installed state the central press-fit peg is press-fitted into an associated press-fit bore, and the positioning pegs are introduced into associated positioning bores arranged in a suitable pattern of holes.

14. The pre-installation assembly as defined by claim 4, wherein as the connection between the clamping component and the support component, a central press-fit peg is provided; and that as the positioning element, a plurality of positioning pegs are provided, and in an installed state the central press-fit peg is press-fitted into an associated press-fit bore, and the positioning pegs are introduced into associated positioning bores arranged in a suitable pattern of holes.

15. The pre-installation assembly as defined by claim 5, wherein as the connection between the clamping component and the support component, a central press-fit peg is provided; and that as the positioning element, a plurality of positioning pegs are provided, and in an installed state the central press-fit peg is press-fitted into an associated press-fit bore, and the positioning pegs are introduced into associated positioning bores arranged in a suitable pattern of holes.

16. The pre-installation assembly as defined by claim 12, wherein the clamping component is embodied as a hoodlike body, with a central cup-shaped press-fit peg and an integrally formed-on, radially projecting annular collar, and at least one positioning peg protrudes at a right angle from a face end of the annular collar, and on an opposite face end of the annular collar, at least one guide embodied as a funnel-like sleeve body protrudes, and the central press-fit peg and the least one positioning peg extend in the same direction.

17. The pre-installation assembly as defined by claim 15, wherein the clamping component is embodied as a hoodlike body, with a central cup-shaped press-fit peg and an integrally formed-on, radially projecting annular collar, and at least one positioning peg protrudes at a right angle from a face end of the annular collar, and on an opposite face end of the annular collar, at least one guide embodied as a funnel-like sleeve body protrudes, and the central press-fit peg and the least one positioning peg extend in the same direction.

18. The pre-installation assembly as defined by claim 1, wherein the end regions of the spring contact pin are formed each by a respective tapered winding section, and the oppositely disposed winding sections are designed mirror-symmetrically with respect to a central transverse axis of the spring contact pin, and transition regions of the spring contact pin from a middle winding section to the winding sections that form tapered end regions are each conically wound, with adaptation to at least one of a conical seat in an associated guide of the support component and a conical seat in an associated guide of the clamping component.

19. The pre-installation assembly as defined by claim 18, wherein the winding sections of the spring contact pin that form the end regions are stiffened by spring windings wound as a block, and the spring windings in the transition regions wound conically of the spring contact pin are at least predominantly likewise wound as a block.

20. A pre-installation assembly for a contact arrangement of a sensor assembly, the assembly comprising a support component, a clamping component, and at least one spring contact pin having end regions of the at least one spring contact pin conductively connected to one another which are embodied as axially pressure resistant and are kept with axial spring loading between spaced-apart support surfaces, the spring contact pin being a helical compression spring and at least predominantly including a spring winding extending over the entire structural length of the pin, the spring winding including a middle section which is axially compressible, and end sections which are connected to opposite ends of the middle section and which are stiffened by inhibition of the axial mobility of their spring windings, and conical transition sections, each transition section connecting a respective end section to a respective end of the middle section, wherein the support component and the clamping component are connected to one another via a connection in which the at least one spring contact pin is positioned and held in the support component and in the clamping component via aligned guides in which the at least one spring contact pin is inserted, wherein a first end section of the at least one spring contact pin is axially braced in an associated guide of the support component, and a second end section of the at least one spring contact pin is axially braced in an associated guide of the clamping component, and wherein the associated guide of the support component has a conical seat on which one of the transition sections is seated, and the associated guide of the clamping component has a conical seat on which the other of the transition sections is seated.

* * * * *